(12) United States Patent
Gandhi et al.

(10) Patent No.: US 9,898,493 B2
(45) Date of Patent: Feb. 20, 2018

(54) RUNTIME GENERATION OF A MAPPING TABLE FOR UPLOADING DATA INTO STRUCTURED DATA MARTS

(71) Applicants: Unmesh Gandhi, Montreal (CA); Ives Toe, Brossard (CA); Evelyna Holban, Laval (CA); GuoTai Chen, Montreal (CA); Tim Gast, Verdun (CA)

(72) Inventors: Unmesh Gandhi, Montreal (CA); Ives Toe, Brossard (CA); Evelyna Holban, Laval (CA); GuoTai Chen, Montreal (CA); Tim Gast, Verdun (CA)

(73) Assignee: SAP SE, Walldorf (DE)

( * ) Notice: Subject to any disclaimer, the term of this patent is extended or adjusted under 35 U.S.C. 154(b) by 617 days.

(21) Appl. No.: 14/517,518

(22) Filed: Oct. 17, 2014

(65) Prior Publication Data

US 2016/0110398 A1  Apr. 21, 2016

(51) Int. Cl.
*G06F 17/30* (2006.01)
(52) U.S. Cl.
CPC .. *G06F 17/30345* (2013.01); *G06F 17/30592* (2013.01)
(58) Field of Classification Search
CPC ......... G06F 17/30292; G06F 17/30339; G06F 17/30569; G06F 17/30076; G06F 17/30584
See application file for complete search history.

(56) References Cited

U.S. PATENT DOCUMENTS

| | | | |
|---|---|---|---|
| 9,015,180 B1* | 4/2015 | Offer | G06F 17/301 707/758 |
| 2009/0106398 A1* | 4/2009 | Seaman, II | G06Q 30/0601 709/219 |
| 2010/0318527 A1* | 12/2010 | Nandy | G06F 3/0484 707/754 |
| 2011/0264541 A1* | 10/2011 | Mohamedsadakathulla | G06Q 30/02 705/14.73 |
| 2015/0120727 A1* | 4/2015 | Shinde | H04L 51/18 707/736 |
| 2015/0234870 A1* | 8/2015 | Kumar, Sr. | G06F 17/30315 707/807 |
| 2016/0132496 A1* | 5/2016 | Gandhi | G06F 17/30106 707/754 |

* cited by examiner

*Primary Examiner* — Carol Choi
(74) *Attorney, Agent, or Firm* — Fountainhead Law Group P.C.

(57) ABSTRACT

Techniques are described for mapping supplemental data from a data delivery package into data marts that are accessible to a software application. In some embodiments, new mappings can be dynamically generated for a mapping table when the data delivery package includes fields which do not have a corresponding mapping in the mapping table. The new mappings can be generated at runtime while the data delivery package is being processed. Once generated, the mapping table can be used to store the supplemental data into the data marts.

17 Claims, 11 Drawing Sheets

600

Content File

| PROD | BRAND | GROUP | LVL |
|---|---|---|---|
| NFHY7QQQQQQQR | SAP | SLC | L_0001 |
| NFHY7QQQQQQST | CAN | ABC | L_0002 |
| NFHY7QQQQQQAB | GRY | XYZ | L_0003 |

Data Mart

| PRODUCT_EXT | ATTR_NAME | ATTR_VALUE |
|---|---|---|
| NFHY7QQQQQQQR | BRAND | SAP |
| NFHY7QQQQQQQR | GROUP | SLC |
| NFHY7QQQQQQQR | LVL | L_0001 |
| NFHY7QQQQQQST | BRAND | CAN |
| NFHY7QQQQQQST | GROUP | ABC |
| NFHY7QQQQQQST | LVL | L_0002 |
| NFHY7QQQQQQAB | BRAND | GRY |
| NFHY7QQQQQQAB | GROUP | XYZ |
| NFHY7QQQQQQAB | LVL | L_0003 |

FIG. 7

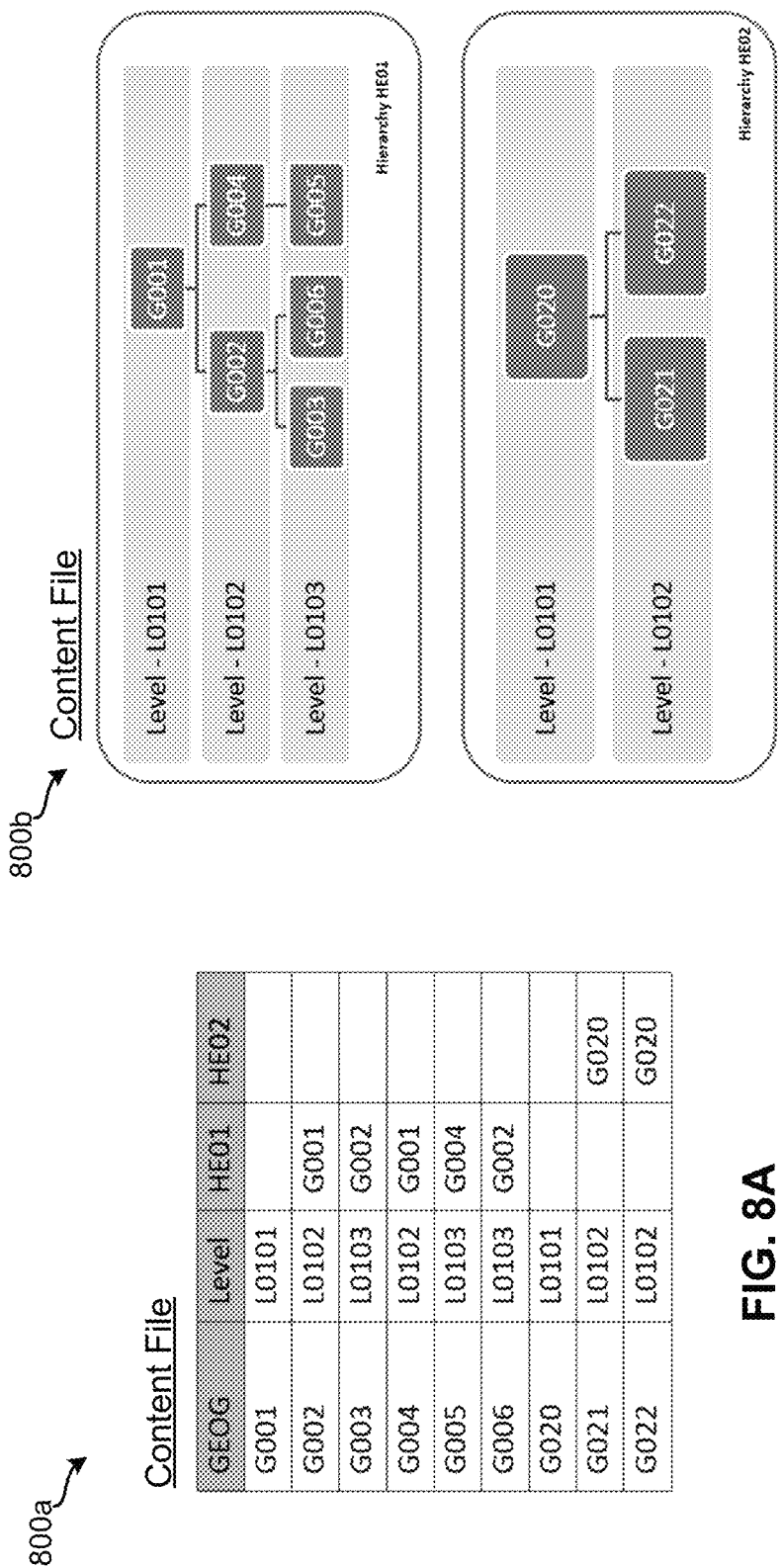

Data Mart

| LOCATION_EXT | HIERARCHY | HIELVL | PARENT |
|---|---|---|---|
| G001 | HE01 | L0101 | |
| G002 | HE01 | L0102 | G001 |
| G003 | HE01 | L0103 | G002 |
| G004 | HE01 | L0102 | G001 |
| G005 | HE01 | L0103 | G004 |
| G006 | HE01 | L0103 | G002 |
| G020 | HE02 | L0101 | |
| G021 | HE02 | L0102 | G020 |

FIG. 8C

RUNTIME GENERATION OF A MAPPING TABLE FOR UPLOADING DATA INTO STRUCTURED DATA MARTS

BACKGROUND

Today's business environment is extremely competitive. To retain an edge, many businesses have turned to market research to discover what consumers watch and buy. However, this market research can be very time consuming for a business to generate. As a result, the market research is often purchased from market research companies which specialize in collecting purchasing data from retailers and aggregating the purchasing data. A business purchases the aggregated data and analyzes the data to provide insight on what customers want. The business can then make adjustments based on the insight to drive profitable growth.

Data collected by market research companies can be stored in a digital format and the analysis performed on the digital data by market research companies is always changing. As a result, market research companies often create new fields or data types to store or describe the aggregated data. For example, a toothpaste product can have a new field generated due to data collected from recent surveys. Frequently, a business is unaware of these changes and as a result, the market research available is not being fully utilized.

SUMMARY

In one embodiment, a computer-implemented method receives, by a processor, a data delivery package that includes a first content file storing incoming data in a plurality of fields and a meta file configured to identify the plurality of fields stored in the first content file. The method then processes, by the processor, the data delivery package to store the incoming data in at least one data mart. Processing the data delivery package comprises identifying, by the processor, a field from the plurality of fields that is missing from a mapping table configured to map the incoming data to at least one data mart, creating, by the processor, a mapping configured to map the field to a data mart, and updating, by the processor, the mapping table to include the mapping.

In another embodiment, a non-transitory computer readable storage medium stores one or more programs comprising instructions for receiving a data delivery package that includes a first content file storing incoming data in a plurality of fields and a meta file configured to identify the plurality of fields stored in the first content file and processing the data delivery package to store the incoming data in at least one data mart, wherein processing the data delivery package comprises identifying a field from the plurality of fields that is missing from a mapping table configured to map the incoming data to the at least one data mart, creating a mapping configured to map the field to a data mart, and updating the mapping table to include the mapping.

In another embodiment, a computer implemented system comprises one or more computer processors and a non-transitory computer-readable storage medium. The non-transitory computer-readable storage medium comprises instructions, that when executed, control the one or more computer processors to be configured for receiving a data delivery package that includes a first content file storing incoming data in a plurality of fields and a meta file configured to identify the plurality of fields stored in the first content file and processing the data delivery package to store the incoming data in at least one data mart, wherein processing the data delivery package comprises identifying a field from the plurality of fields that is missing from a mapping table configured to map the incoming data to the at least one data mart, creating a mapping configured to map the field to a data mart, and updating the mapping table to include the mapping.

The following detailed description and accompanying drawings provide a better understanding of the nature and advantages of the present disclosure.

BRIEF DESCRIPTION OF THE DRAWINGS

FIG. 6 illustrates a content file according to one embodiment;

FIG. 7 illustrates a data mart according to one embodiment;

FIG. 8A illustrates a content file according to another embodiment;

FIG. 8B illustrates a visual representation of the content file of FIG. 8A according to one embodiment;

FIG. 8C illustrates a data mart storing the contents of content file 800a according to one embodiment

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Disclosed herein are techniques for dynamically generating supplemental mappings for a mapping table at runtime. Each mapping in the mapping table is configured to map a field from an incoming delivery package to another field. The another field can belong to a data mart which is accessible by the software application. Thus, the mapping table allows data from the incoming delivery package to be mapped and stored in fields within the data mart. The software application is capable of analyzing the data once it is stored within the data mart. In some embodiments, the software application can initially generate a mapping table from information provided during design time. For example, a data delivery provided by the data provider can be used to generate the mapping table. During runtime, the software application can then supplement the mapping table with new mappings that were introduced by the data provider which were not present in the data delivery agreement. This allows the software application to import new fields of data that were added in by the data provider after design time.

Figure 1:
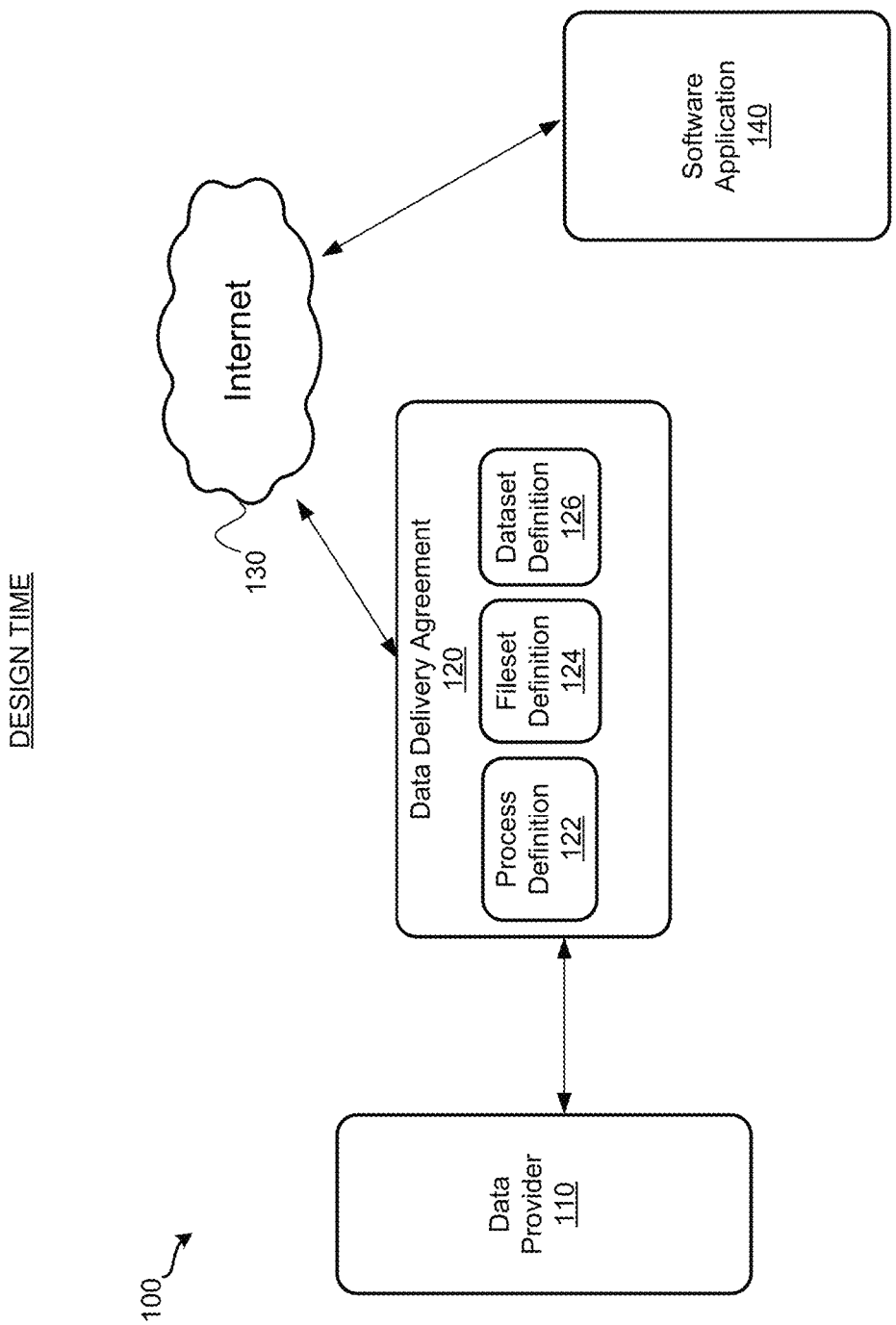
FIG. 1 illustrates an exemplary system diagram according to one embodiment.

FIG. 1 illustrates an exemplary system diagram according to one embodiment. System 100 includes data provider 110 transferring data delivery agreement 120 to software application 140 via internet 130. Data delivery agreement 120 can include instructions on how to retrieve and process delivery packages from data provider 110. Each delivery package can update the database of information accessible to software application 140. This allows software application 140 to operate on the most up to date information. Data provider 110 can periodically generate new data and package it in a delivery package for its customers. The new data can be generated from market research or analysis of existing data.

Data delivery agreement 120 can include process definition 122. Process definition 122 defines a process in which delivery packages can be retrieved and incorporated into data marts accessible by software application 140. An upload framework can execute the process to upload the contents of the delivery package to the data mart. Data delivery agreement 120 can further include fileset definition 124. Fileset definition 124 defines the location in which the delivery packages can be found. For example, fileset definition 124 can define where to find the delivery packages within a network folder when the delivery packages are available. Dataset definition 126 can provide information on the type of data that is going to be provided in the delivery package. In some examples, dataset definition 126 can also provide information on the data mart and the fields within the data mart which should store the data within the delivery package. In some examples, data provider 110 can be a research institute that is configured to provide market research on one or more products. The results of the market research can be transmitted to the customer for use. Updates to the market research can be received according to the data delivery agreement 120. In some embodiments, data provider 110 can define data delivery agreement 120 at design time as the data provider 110 figures out which software application 140 is accessing the data, how software application 140 stores the data, and preferred mappings to map the data to the data marts.

Figure 2:
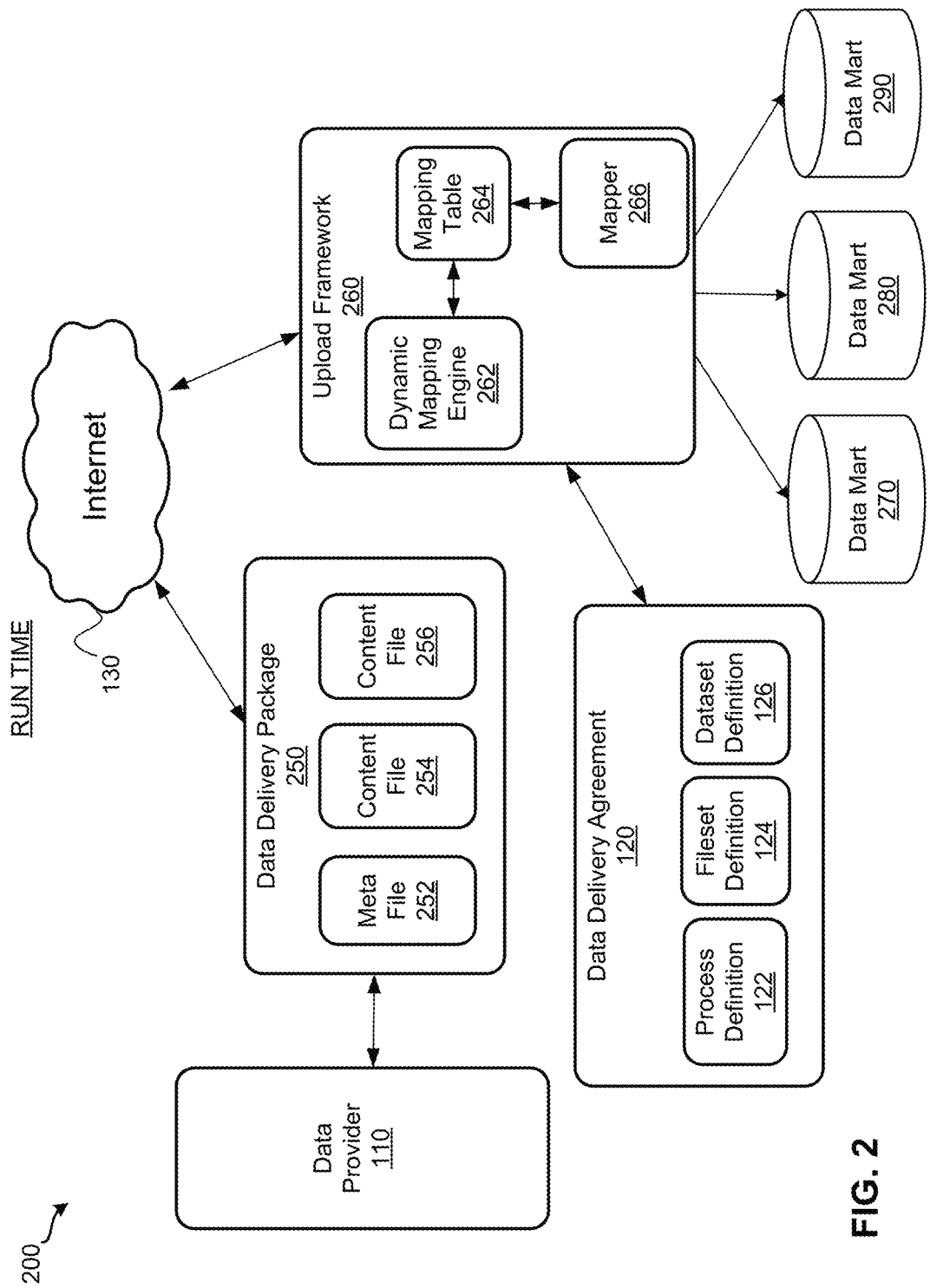
FIG. 2 illustrates an exemplary system according to another embodiment.

FIG. 2 illustrates an exemplary system according to another embodiment. System 200 includes data provider 110 transferring data delivery package 250 to upload framework 260 via internet 130. Data delivery package 250 can contain supplemental data from data provider 110 that is to be incorporated into existing data that is accessible to the software application. Upload framework 260 can receive and process data delivery package 250, resulting in the supplemental data being stored within data marts 270, 280, and/or 290. In some examples, a data mart can be configured to store product attributes, product name value pair and/or product hierarchies.

Data delivery package 250 can contain multiple files. Some files can contain the supplemental data while other files can describe the formatting of the supplemental data. Here, content file 254 and 256 can store the supplemental data. The format in which the supplemental data is stored within content file 254 and 256 can be described in meta file 252. Since each data delivery package can contain different attributes, each meta file can be unique for its corresponding data delivery package. For example, meta file 252 can describe the field to be delivered as part of data delivery package 250 and the length of each field. However, meta file 252 may not be applicable to a subsequent data delivery package since the content files of the subsequent delivery package may be in a different format that described in meta file 252.

Upload framework 260 can include dynamic mapping engine 262 and mapper 266. Dynamic mapping engine 262 can be configured to dynamically generate entries in mapping table 264 during runtime. In some embodiments, dynamic mapping engine 262 can be configured to process dataset definition 126 along with meta file 252 to generate entries in mapping table 264. Mapping table 264 contains mappings that map a field from content file 254 (or content file 256) to a field within one or more data marts. Mapper 266 is configured to upload the supplemental data in content files 254 and 256 to data marts 270, 280, and 290 according to mapping table 264.

Figure 3:
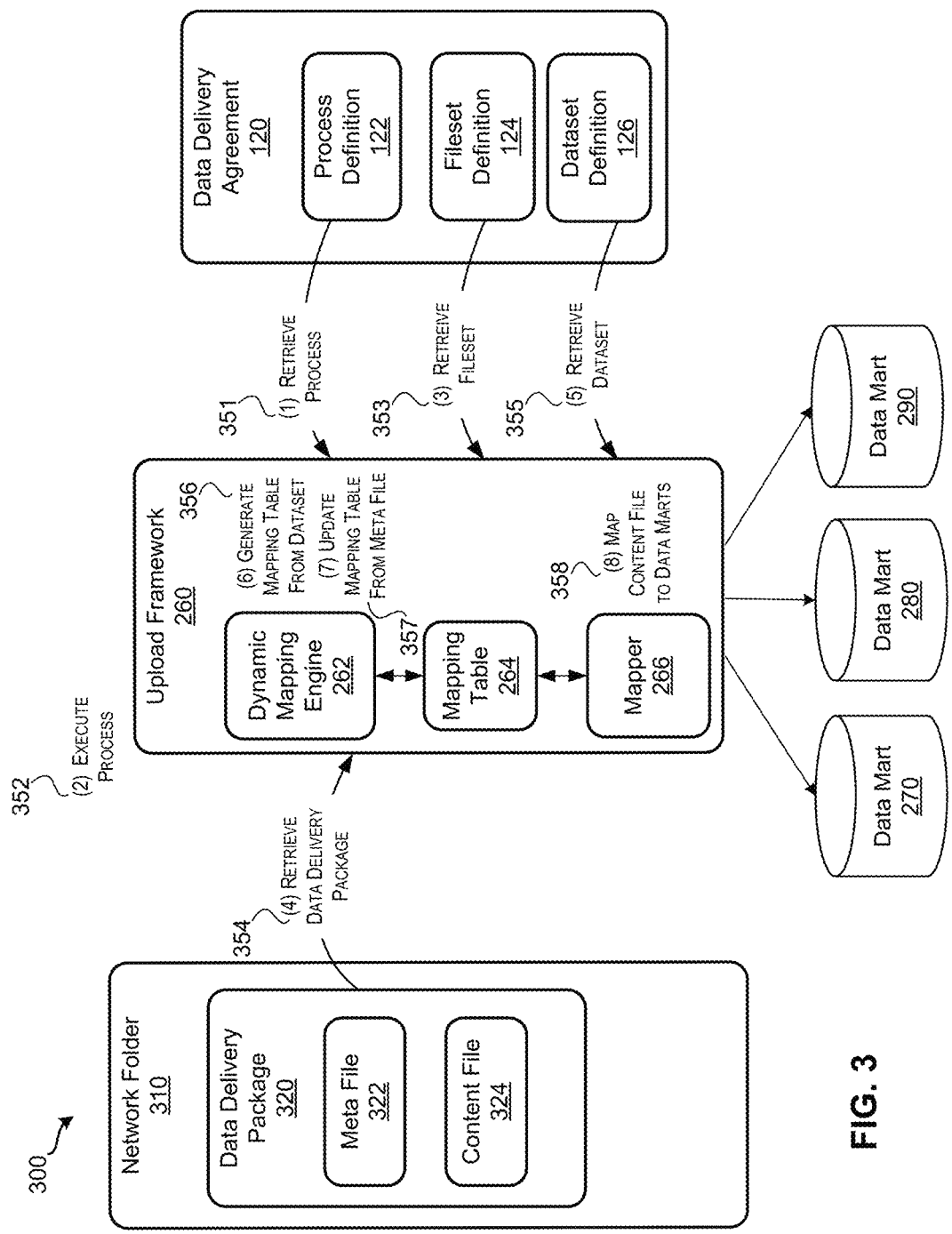
FIG. 3 illustrates an exemplary system for updating the content stored within data marts according to one embodiment.

FIG. 3 illustrates an exemplary system for updating the content stored within data marts according to one embodiment. System 300 includes network folder 310. Network folder 310 can be storage on a network that is configured to store multiple data delivery packages. Upload framework 260 can access network folder 310 to retrieve a desired data delivery package. Once retrieved, upload framework 260 can upload supplemental data within the data delivery package to data marts 270, 280, and 290, thereby updating the data marts.

To update the data marts, upload framework 260 can first retrieve process definition 122 from data delivery agreement 120 at step (1) (reference numeral 351). Process definition 122 can provide instructions on how to update the data marts. In one embodiment, process definition 122 can include steps (2) to (8) shown in FIG. 3. In one example, data delivery agreement 120 can be provided to upload framework 260 at an earlier point in time. Alternatively, upload framework 260 can retrieve data delivery agreement 120 from storage.

Once process definition 122 has been retrieved, upload framework 260 can execute the process defined in process definition 122 at step (2) (reference numeral 352). Executing the process can result in upload framework 260 performing steps (3) to (8), starting with upload framework 260 retrieving fileset definition 124 from data delivery agreement 120 at step (3) (reference numeral 353). From fileset definition 124, upload framework 260 can identify the storage location of data delivery package 320 within network folder 310 and retrieve data delivery package 320 at step (4) (reference numeral 354). Upload framework 260 can then retrieve dataset definition 126 from data delivery agreement 120 at step (5) (reference numeral 355). Once dataset definition 126 is retrieved, upload framework 260 can generate mapping table 264 from dataset definition 126 at step (6) (reference numeral 356). In one embodiment, dynamic mapping engine 262 of upload framework 260 can generate mapping table 264 at runtime.

At this point, mapping table 264 can include the mappings specified by dataset definition 126. However, mapping table 264 may lack mappings for new fields that are introduced in data delivery package 320 but are not described in data delivery agreement 120. For example, data delivery package 320 can include one or more fields which were not available during design time and thus are not part of mapping table 264. To account for these missing fields, upload framework 260 can update mapping table 264 according to meta file 322 at step (7) (reference numeral 357). In one embodiment, dynamic mapping engine 262 of upload framework 260 can search meta file 322 for fields that do not have a mapping (e.g., missing a mapping) within mapping table 264. Dynamic mapping engine 262 can in turn generate the supplemental mappings for the fields that are missing a mapping and add the supplemental mappings to mapping table 264. The supplemental mappings can be new entries within mapping table 264. In one embodiment, dynamic mapping engine 262 can generate a new entry in a data mart that describes the field. Dynamic mapping engine 262 can then generate a mapping to map the field to the new entry.

Once mapping table 264 has been updated, upload framework 260 can update the data marts by mapping the data in content file 324 to data marts 270, 280, and 290 at step (8) (reference numeral 358). In one embodiment, mapper 266 of upload framework 260 can utilize upload the contents of content file 324 to fields within data marts 270, 280, and 290 according to mapping table 264. For example, mapper 266 can identify a value for a field within content file 324. Mapper 266 can then search for a mapping associated with the field within mapping table 364. Once the mapping is found, mapper 266 can store the value for the field in one or more fields of data marts 270, 280, or 290 based on the mapping.

Figure 4:
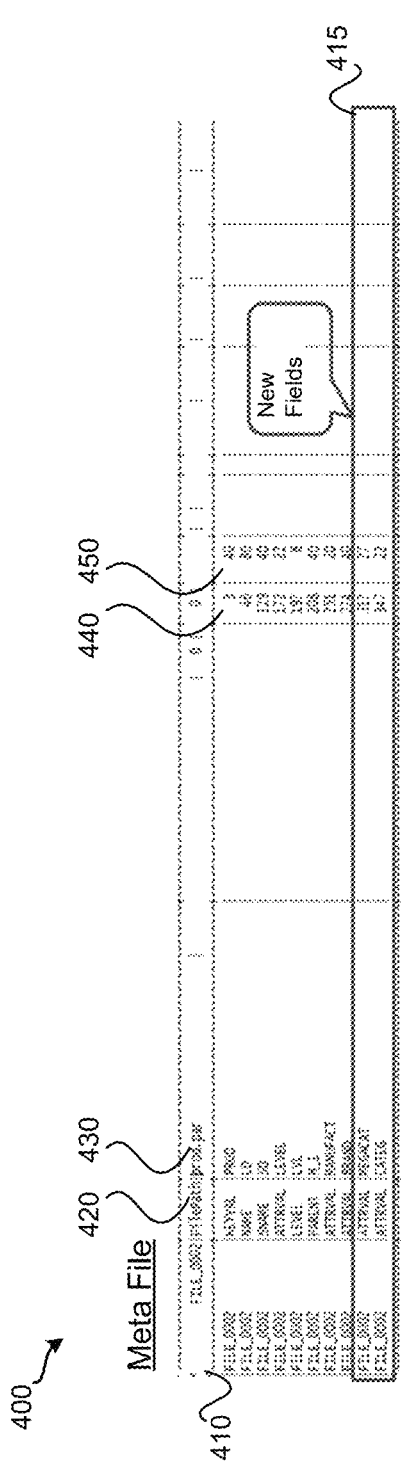
FIG. 4 illustrates an exemplary meta file according to one embodiment.

FIG. 4 illustrates an exemplary meta file according to one embodiment. As shown, meta file 400 is configured as a table where each row of the table represents a field and each column represents an attribute of that field. Column 410 is a file column that is configured to store the name of the content file which the field belongs to. Here, meta file 400 is configured to describe the content file titled "FILE_0002" and therefore "FILE_0002" occupies the entries within column 410. Column 420 is a filepath column that is configured to store the data type of the field. Column 430 is a prod.par column that is configured to store the name of the attribute. Column 440 is a start index in the content file where the field can be found while column 450 is a duration index that specifies the length of the field. For example, meta file 400 states that the first field is called "PROD" and has a data type of KEYVAL" which starts at the third byte of the content file titled "FILE_002" and spans a length of 40 bytes.

Figure 5:
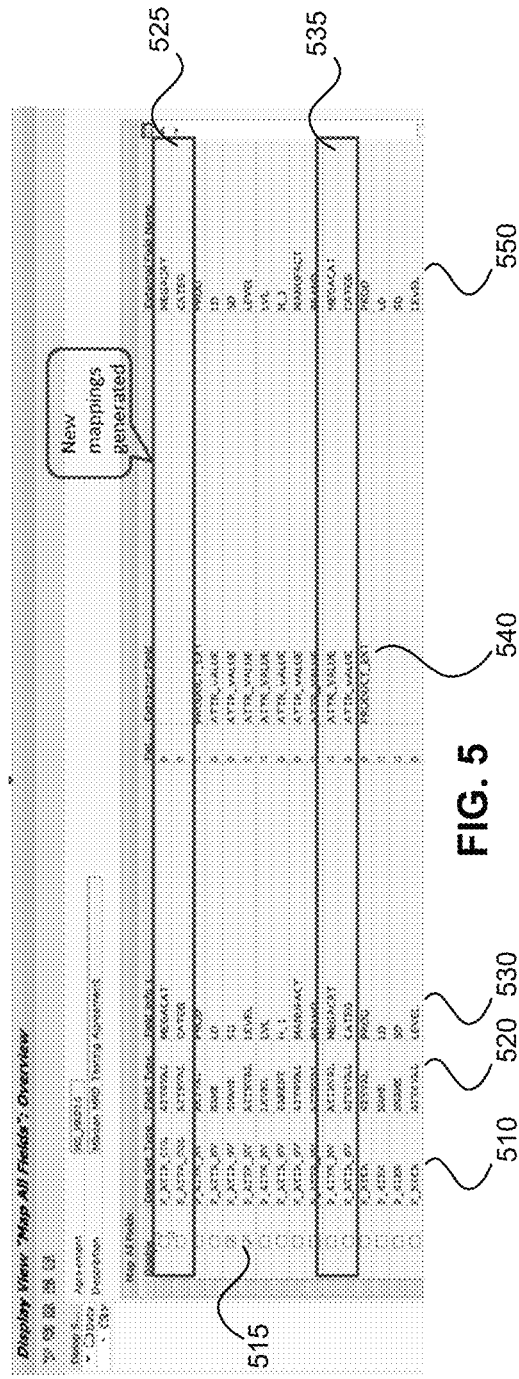
FIG. 5 illustrates an exemplary mapping table according to one embodiment.

FIG. 5 illustrates an exemplary mapping table according to one embodiment. As shown, mapping table 500 is configured as a table where each row of the table represents a mapping an each column represents an attribute of that mapping. Each mapping consists of two parts—an input field and an output field. The input field describes the field that is part of the content file to be mapped while the output field describes the destination of the input field. Here, columns 520 and 530 describe the input field while columns 540 describe the output field. Column 510 is configured to store the type of mapping that is being applied to a particular mapping. Column 520 is configured to store the data type of the incoming field. Column 530 is configured to store the name of the incoming field. Column 540 is configured to store the name of the outgoing field (i.e. SAP data mart field name). Column 550 is configured to store the alias for column 530. System administrator can manually maintain this field for various business needs. In absence of such activity column 530 and 550 contains same information. For example, attribute 515 is a name-value pair mapping (P_ATTR_NV). The incoming field is titled LEVEL and has a data type ATTR_VAL. The mapping specifies that when an incoming field with these attributes is received, the value of the incoming field should be stored within an output field titled ATTR_VALUE. One or more data marts may have this output field and as a result, the one or more data marts may store the value within the output field.

In one embodiment, dynamic mapping engine 262 can generate new mappings and store them in mapping table 500 for any fields within meta file 400 which do not have a corresponding mapping in mapping table 500. Here, mapping table 500 was originally missing mappings for fields 415 in FIG. 4. As a result, mappings for fields 415 can be generated dynamically at runtime. Dynamic mapping engine 262 can generate two different mappings for each new field discovered from meta file 400. Here, the mappings generated for the fields 415 are mappings 525 and 535. Mapping 525 is an attribute-column mapping while mapping 535 is a name-value pair mapping. An attribute-column mapping can include instructions for how to map a field from a content file to a data mart. The content is stored within the data mart but not a particular field. In contrast, a name-value pair mapping can include instructions for mapping a field from the content file into a newly created field within the data mart. The newly created field will be titled the same name as the field in the content file and will be configured to store a value.

In one example, the system knows that incoming field "MEGACAT" is to be mapped to a field in the data mart named 'Category.' If this is the case, then dynamic mapping engine 262 can create an entry in mapping table where the Extractor Field="Category" and the Field Info 1="MEGACAT." In such scenario mapper 266 uses this information and does the mapping accordingly and stores the information into data marts. Attribute-column mapping means system knows where\how to map fields coming from content files into data marts and mapping gets created accordingly in mapping table.

In scenarios where the system doesn't know how to map incoming fields from content files into SAP data marts. In this case system creates name value pair mapping in mapping table and mapper uses this information to map the data in data mart as name value pair. In both the scenarios, data gets loaded into data marts. The difference is which data mart gets loaded as each data mart contains the information in different way. Also mapping table creates entries for both types of mapping via attribute column and name value mapping as per business needs.

FIG. 6 illustrates a content file according to one embodiment. Content file 600 includes three products. Each product has three fields—a brand field, a group field and a level field to describe the hierarchy. The first product is named "NFHY7QQQQQQQR," is of brand SAP, belongs to the group SLC, and has a hierarchical level of L_0001.

FIG. 7 illustrates a data mart according to one embodiment. Here, the contents of content file 600 have been mapped into data mart 700. Each row within data mart 700 represents an attribute of content file 600. The first row states that for the product named "NFHY7QQQQQQQR," value for the field BRAND is SAP. The second row states that for the product named "NFHY7QQQQQQQR," the value for the field GROUP is SLC. Since content file 600 includes three data fields for each product, data mart 700 can store each attributes as a separate row. Thus, each product can have three rows within data mart 700.

FIG. 8A illustrates a content file according to another embodiment. Content file 800a describes the hierarchy of multiple items. FIG. 8B illustrates a visual representation of the content file of FIG. 8A according to one embodiment. The visual representation 800b illustrates that there are content file 800*a* describes two hierarchies. The first hierarchy includes three levels while the second hierarchy includes two levels.

FIG. 8C illustrates a data mart storing the contents of content file 800*a* according to one embodiment. As shown, data mart 800*c* includes four columns that are used to describe each item within content file 800*a*. Here, the mapping has stored each item in a different format than it appears in content file 800*a*. Data mart 800*c* includes columns to store the hierarchy that the item belongs to, the hierarchy level of the item within the hierarchy, and the parent item. Through these attributes, data mart 800*c* can recreate the visual representation 800*b*.

As described above, the supplemental data can be received as multiple content files. In one example, each content file can contain some of the attributes for an entry. Thus, each content file contains one or more attributes related to an entry. This is known as vertical splitting. In another example, each content file can contain all the attributes for at least one entry. Thus, each content file contains one or more entries. This is known as horizontal splitting. In some embodiments, dynamic mapping engine 262 can differentiate between these two scenarios and process the content files based on whether the content files are vertically split or horizontally split. In one example, dynamic mapping engine 262 can make this determination by reading the meta file. Based on this dynamic mapping engine 262 creates unique entries in mapping table. Based on the split, the relevant content files are read and mapper 266 maps the data from files into relevant data marts using mapping information provided in mapping table. In one embodiment, dynamic mapping engine 262 can differentiate between the two scenarios, by reading the meta file. If the meta file contains all the same fields for all content files belonging to one dimension then horizontal splitting has been applied Alternatively if the meta file does not contain all the same fields for all content files belonging to one dimension, then vertical splitting has been applied.

Figure 9:
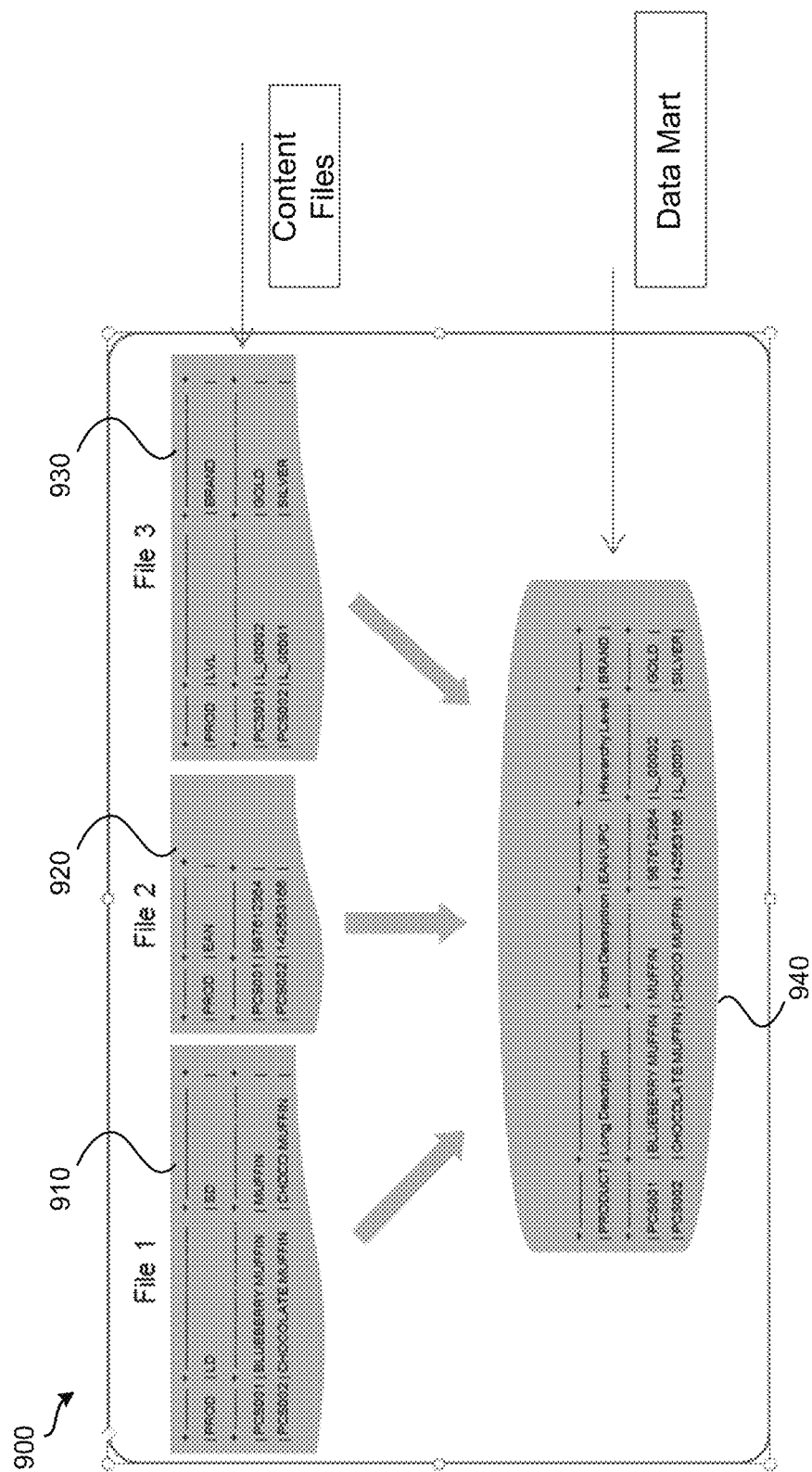
FIG. 9 illustrates vertical splitting between content files according to one embodiment.

FIG. 9 illustrates vertical splitting between content files according to one embodiment. Here, content files 910, 920, and 930 have been received by dynamic mapping engine 262. Mapper 266 determines that vertical splitting has been applied and processes the content files accordingly. In vertical splitting, all content files are first read. The mapper maps the first content file and stores the supplemental data in memory. The mapper then continues to read the next content file and merges the information with the supplemental data that are already in memory. This process of reading the content files and merging the information in memory is repeated until all content files are read. After processing, the supplemental data in content files 910, 920, and 930 that is stored in memory are stored in data mart 940.

Figure 10:
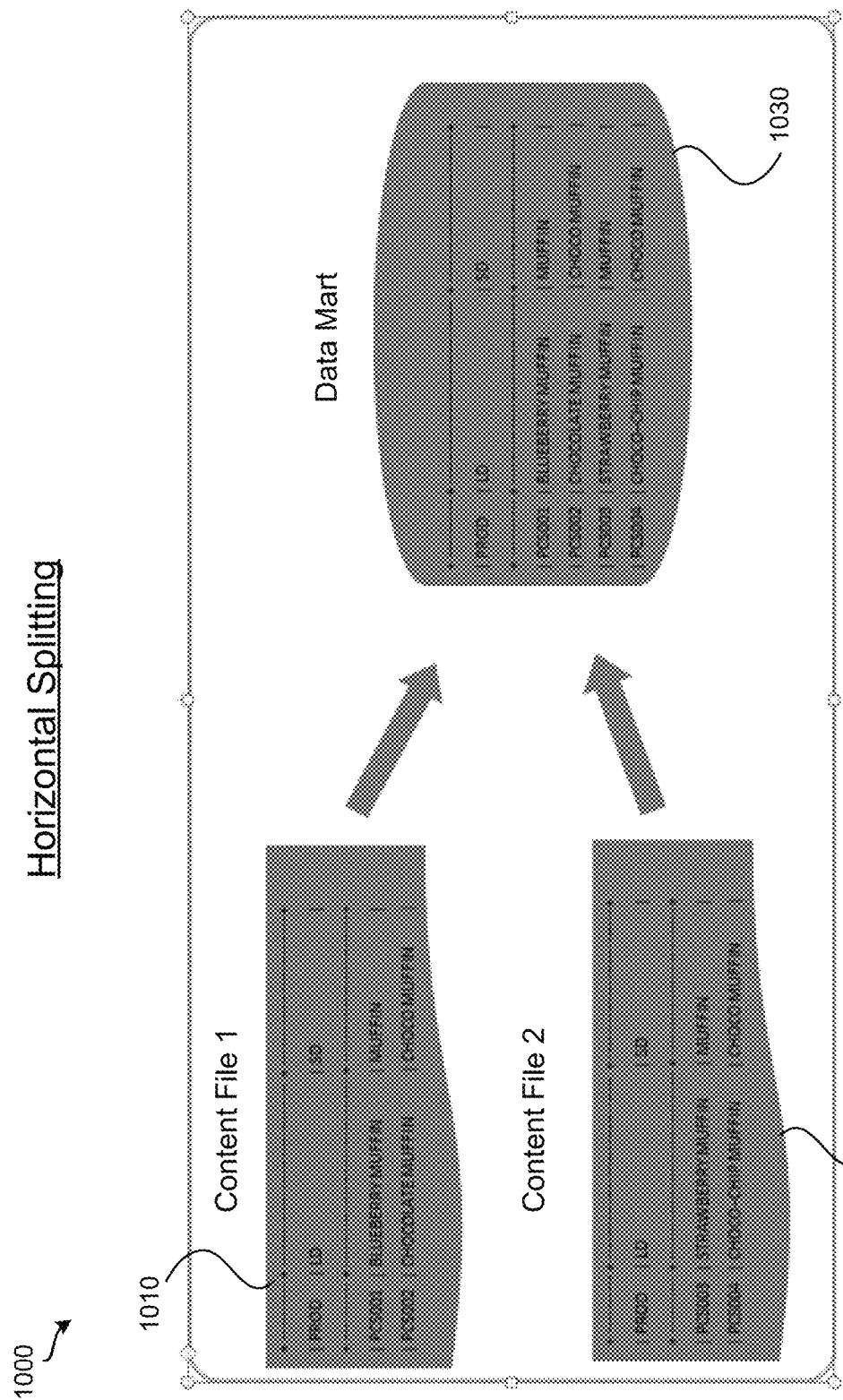
FIG. 10 illustrates horizontal splitting between content files according to one embodiment.

FIG. 10 illustrates horizontal splitting between content files according to one embodiment. Here, content files 1010 and 1020 have been received by dynamic mapping engine 262. Mapper 266 can determine that horizontal splitting has been applied and processes the content files accordingly. In horizontal splitting, mapper 266 reads the content files and the mapper maps the information into the data marts one after the other. For example, the first content file is processed followed by the second content file. After processing, the supplemental data in content files 1010 and 1020 are stored in data mart 1030.

Figure 11:
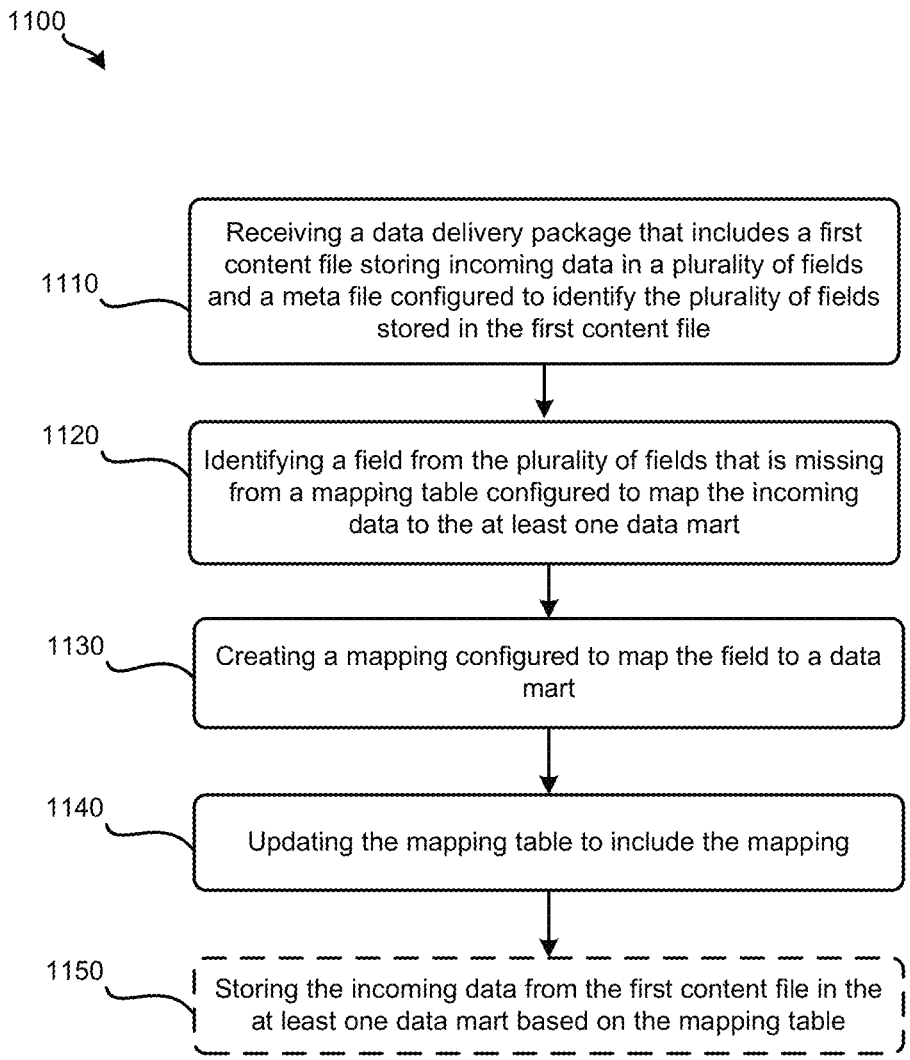
FIG. 11 illustrates a process for mapping supplemental data stored in a data delivery package to data marts according to one embodiment.

FIG. 11 illustrates a process for mapping supplemental data stored in a data delivery package to data marts according to one embodiment. Process 1100 can be stored in computer readable code and executed by a processor. For example, process 1100 can be part of the computer readable code that is executed by upload framework 260 of FIG. 2. Process 1100 can begin by receiving a data delivery package at 1110. The data delivery package can include a first content file storing incoming data in a plurality of fields and a meta file configured to identify the plurality of fields stored in the first content file. After receiving the data delivery package, process 1100 can process the data delivery package to store the incoming data in at least one data mart. This can include identifying a field from the plurality of fields that is missing from a mapping table at 1120. The mapping table can be configured to map the incoming data within the data delivery package to the at least one data mart. Process 1100 then continues by creating a mapping configured to map the field to a data mart at 1130. The mapping can be an attribute column-based mapping. The mapping can also be attribute name/value pair mapping. Once the mapping has been created, process 1100 can update the mapping table to include the mapping at 1140. Process 1100 can then optionally continue by storing the incoming data from the first content file in the at least one data mart based on the mapping at 1150.

Figure 12:
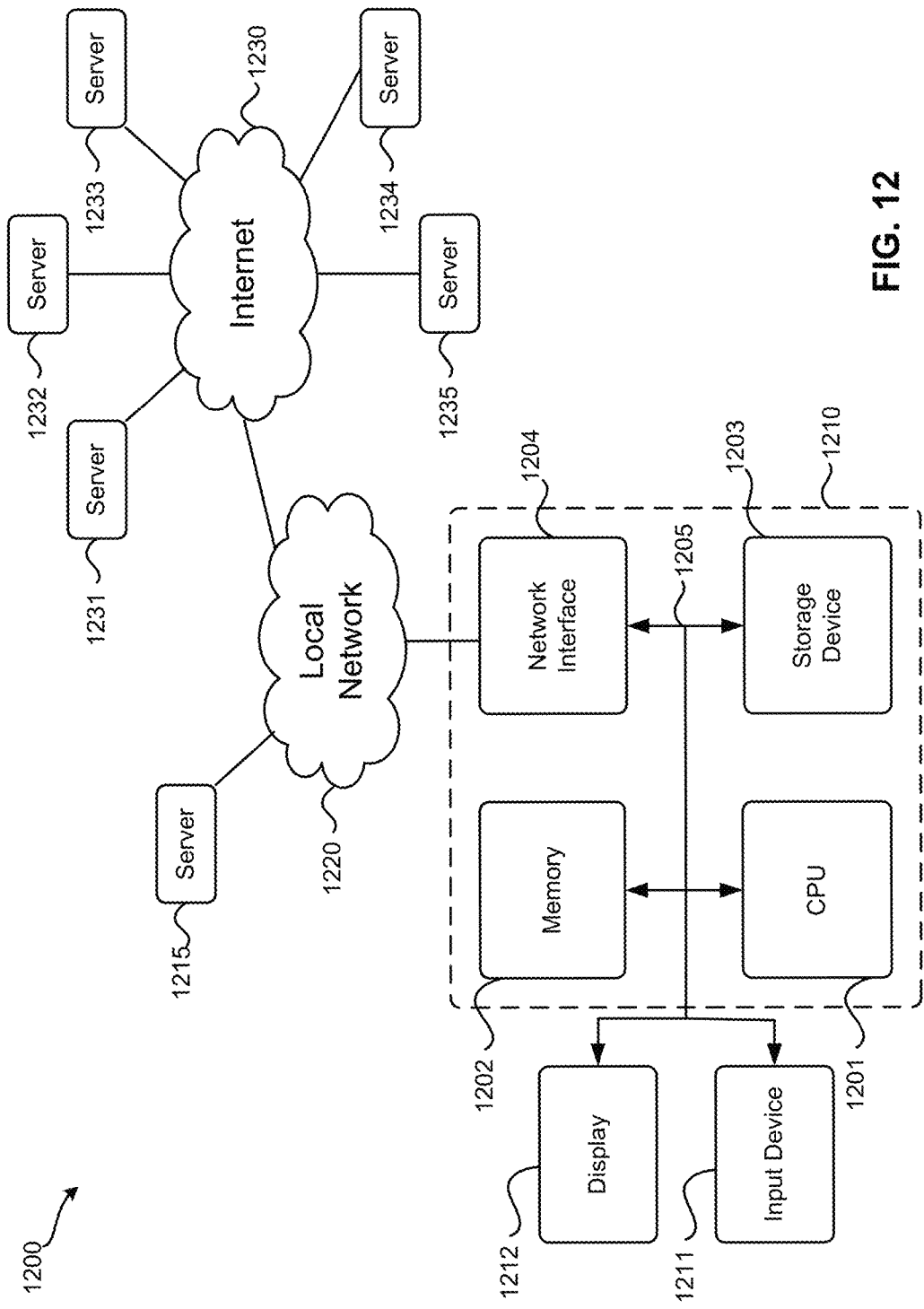
FIG. 12 illustrates an exemplary computer system according to one embodiment.

An exemplary computer system 1200 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    receiving, by a processor, a data delivery package that includes a first content file storing incoming data in a plurality of fields and a meta file configured to identify the plurality of fields stored in the first content file; and
    processing, by the processor, the data delivery package to store the incoming data in at least one data mart, wherein processing the data delivery package comprises:
        identifying, by the processor, a field from the plurality of fields that is missing from a mapping table configured to map the incoming data to the at least one data mart;
        creating, by the processor, a mapping configured to map the field to a data mart; and
        updating, by the processor, the mapping table to include the mapping, wherein the data delivery package further includes a second content file and wherein processing the data delivery package further comprises:
        determining, by the processor, a vertical splitting technique based on the meta file, the vertical splitting technique describing how the incoming data is split between the first content file and the second content file; and
        extracting, by the processor, the incoming data from the first content file and the second content file according to the vertical splitting technique, wherein the extracting comprises storing the incoming data from the first content file in a memory followed by merging the incoming data from the second content file in the memory.

2. The computer-implemented method of claim 1, wherein processing the data delivery package further comprises:
    storing, by the processor, the incoming data from the first content file within the at least one data mart based on the mapping table.

3. The computer-implemented method of claim 1, wherein the mapping table is defined at design time and the mapping is created at run time.

4. The computer-implemented method of claim 1, wherein creating the mapping comprises:
    generating, by the processor, a new entry in the data mart that describes the field; and
    generating, by the processor, the mapping to map the field to the new entry.

5. The computer-implemented method of claim 4, wherein a name parameter associated with the new entry is set to another name parameter associated with the field.

6. The computer-implemented method of claim 4, wherein the mapping includes an attribute column-based mapping and an attribute name/value pair mapping.

7. A non-transitory computer readable storage medium storing one or more programs, the one or more programs comprising instructions for:
    receiving a data delivery package that includes a first content file storing incoming data in a plurality of fields and a meta file configured to identify the plurality of fields stored in the first content file; and
    processing the data delivery package to store the incoming data in at least one data mart, wherein processing the data delivery package comprises:
        identifying a field from the plurality of fields that is missing from a mapping table configured to map the incoming data to the at least one data mart;
        creating a mapping configured to map the field to a data mart; and
        updating the mapping table to include the mapping, wherein the data delivery package further includes a second content file and wherein processing the data delivery package further comprises:
        determining a vertical splitting technique based on the meta file, the vertical splitting technique describing how the incoming data is split between the first content file and the second content file; and
        extracting the incoming data from the first content file and the second content file according to the vertical splitting technique, wherein the extracting comprises storing the incoming data from the first content file in a memory followed by merging the incoming data from the second content file in the memory.

8. The non-transitory computer readable storage medium of claim 7, wherein processing the data delivery package further comprises:
    storing the incoming data from the first content file within the at least one data mart based on the mapping table.

9. The non-transitory computer readable storage medium of claim 7, wherein the mapping table is defined at design time and the mapping is created at run time.

10. The non-transitory computer readable storage medium of claim 7, wherein creating the mapping comprises:
    generating a new entry in the data mart that describes the field; and
    generating the mapping to map the field to the new entry.

11. The non-transitory computer readable storage medium of claim 10, wherein a name parameter associated with the new entry is set to another name parameter associated with the field.

12. The non-transitory computer readable storage medium of claim 10, wherein the mapping includes an attribute column-based mapping and an attribute name/value pair mapping.

13. A computer implemented system, comprising:
one or more computer processors; and
a non-transitory computer-readable storage medium comprising instructions, that when executed, control the one or more computer processors to be configured for:
receiving a data delivery package that includes a first content file storing incoming data in a plurality of fields and a meta file configured to identify the plurality of fields stored in the first content file; and
processing the data delivery package to store the incoming data in at least one data mart, wherein processing the data delivery package comprises:
identifying a field from the plurality of fields that is missing from a mapping table configured to map the incoming data to the at least one data mart;
creating a mapping configured to map the field to a data mart; and
updating the mapping table to include the mapping, wherein the data delivery package further includes a second content file and wherein processing the data delivery package further comprises:
determining a vertical splitting technique based on the meta file, the vertical splitting technique describing how the incoming data is split between the first content file and the second content file; and
extracting the incoming data from the first content file and the second content file according to the vertical splitting technique, wherein the extracting comprises storing the incoming data from the first content file in a memory followed by merging the incoming data from the second content file in the memory.

14. The computer implemented system of claim 13, wherein the mapping table is defined at design time and the mapping is created at run time.

15. The computer implemented system of claim 13, wherein creating the mapping comprises:
generating a new entry in the data mart that describes the field; and
generating the mapping to map the field to the new entry.

16. The computer implemented system of claim 15, wherein a name parameter associated with the new entry is set to another name parameter associated with the field.

17. The computer implemented system of claim 15, wherein the mapping includes an attribute column-based mapping and an attribute name/value pair mapping.

* * * * *